United States Patent
Sankaran et al.

(10) Patent No.: US 12,221,932 B1
(45) Date of Patent: Feb. 11, 2025

(54) INTEGRATED GAS TURBINE ENERGY RECOVERY SYSTEM FOR EFFICIENCY ENHANCEMENT

(71) Applicant: SAUDI ARABIAN OIL COMPANY, Dhahran (SA)

(72) Inventors: Sivakumar Sankaran, Ras Tanura (SA); Mohammed A. Alswayied, Riyadh (SA); Naif M. Alghuthayf, Dammam (SA); Abdullah H. Jaber, Dhahran (SA); Mubarak Alabdulaaly, Unayzah (SA); Tejavath Balaji, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/650,435

(22) Filed: Apr. 30, 2024

(51) Int. Cl.
  *F02C 9/50* (2006.01)

(52) U.S. Cl.
  CPC ............ *F02C 9/50* (2013.01); *F05D 2270/20* (2013.01); *F05D 2270/301* (2013.01)

(58) Field of Classification Search
  CPC ...... F02C 9/50; F02C 6/04; F02C 6/12; F05D 220/40; F05D 270/20; F05D 270/301
  See application file for complete search history.

(56) References Cited

U.S. PATENT DOCUMENTS

| | | | | |
|---|---|---|---|---|
| 2013/0205752 | A1* | 8/2013 | Suciu | F02K 3/025 60/226.1 |
| 2014/0271121 | A1* | 9/2014 | Kupratis | F01D 9/02 415/207 |
| 2018/0172012 | A1* | 6/2018 | Plante | F01D 9/02 |
| 2018/0216525 | A1* | 8/2018 | Plante | F02C 7/36 |

FOREIGN PATENT DOCUMENTS

| | | |
|---|---|---|
| CN | 103590891 B | 1/2016 |
| CN | 111779575 A | 10/2020 |
| EP | 3112618 A1 | 1/2017 |

OTHER PUBLICATIONS

A. M. Bagabir et al., "Experimental and Theoretical Study of Micro Gas Turbine Performance Augmentation", Emirates Journal for Engineering Research, 2011, vol. 16, No. 2, pp. 79-88 (11pages).

* cited by examiner

*Primary Examiner* — Todd E Manahan
*Assistant Examiner* — Rodolphe Andre Chabreyrie
(74) *Attorney, Agent, or Firm* — Osha Bergman Watanabe & Burton LLP (57) ABSTRACT

Various systems, devices, and methods that may be used for increasing the efficiency of a gas turbine cycle are discussed. As an example, a method is discussed that includes using one or more blowers to increase efficiency in a turbine cycle where such blowers may be powered, for example, using energy from a stream of combustion products, from a pressurized fuel source, and/or from an electric motor. Upon reading, one of ordinary skill in the art will recognize a large variety of additional embodiments.

20 Claims, 8 Drawing Sheets

INTEGRATED GAS TURBINE ENERGY RECOVERY SYSTEM FOR EFFICIENCY ENHANCEMENT

BACKGROUND

Gas turbines convert chemical energy stored in some types of liquid or gaseous fuels to mechanical energy. In turn, this mechanical energy may be converted to another form of energy, such as, for example, electrical energy. The process of converting from chemical energy to mechanical energy is inefficient. These inefficiencies increase the cost of generating mechanical energy, and any other form of energy from the mechanical energy.

Accordingly, there exists a need in the art for gas turbine processes with improved efficiencies.

SUMMARY

This summary is provided to introduce a selection of concepts that are further described below in the detailed description. Further, upon reading one of ordinary skill in the art will recognize a variety of embodiments in addition to those outlined in this summary. This summary is not intended to identify key or essential features of the claimed subject matter, nor is it intended to be used as an aid in limiting the scope of the claimed subject matter.

Some embodiments provide methods that include directing a stream of compressed air exiting an outlet of a compressor to a combustor, and injecting a stream of fuel into the combustor, where a chemical reaction occurs in the combustor to yield a stream of combustion products. The method also includes using a turbine to expand the stream of combustion to yield an expanded stream of combustion products, to then direct the expanded stream of combustion products to a low-pressure turbocharger. The method includes using the low-pressure turbocharger to power a first air blower, where the first air blower is configured to accept a first stream of filtered air and to output a first blower gas stream. The method includes directing the first blower gas stream to a secondary air distribution system, where an output of the secondary air distribution system is an energized stream of air. The method also includes directing the energized stream of air and a stream of filtered air to a primary air distribution system. An output of the primary air distribution system is a stream of compressor supply air, which is directed to an inlet of the compressor in this method.

In another aspect, embodiments disclosed herein relate to a system for increasing the efficiency of a gas turbine cycle. The system includes a compressor, a combustor, a turbine, a low-pressure turbocharger, and a first air blower. The compressor includes a compressor inlet and a compressor outlet, and is configured to increase a pressure of a stream of compressor supply air while expelling a compressed stream of air. The compressed stream of air enters the combustor through a first combustor inlet, while a stream of fuel enters the combustor via a second combustor inlet. The combustor is configured to allow a chemical reaction between the compressed stream of air and the stream of fuel, to yield a stream of combustion products. The turbine is fluidically coupled downstream from a combustor outlet. The turbine is configured to expand the stream of combustion products and yield an expanded stream of combustion products, which exit via a turbine outlet. The low-pressure turbocharger is fluidically coupled to the turbine outlet and configured to power the first air blower using energy from the expanded stream of combustion products. The first air blower is configured to accept a first stream of filtered air and to output a first blower gas stream. The first blower gas stream is incorporated into the stream of compressor supply air.

Other aspects and advantages of the claimed subject matter will be apparent from the following description and the appended claims.

BRIEF DESCRIPTION OF DRAWINGS

Wherever possible, like or identical reference numerals are used in the figures to identify common or the same elements. The figures are not necessarily to scale, and certain features and certain views of the figures may be shown exaggerated in scale for purposes of clarification.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g. first, second, third, etc.) may be used as an adjective for an element (i.e. any noun in the application). The use of ordinal numbers is not to imply or create any particular ordering of the elements nor to limit any element to being only a single element unless explicitly disclosed, such as using the terms "before", "after", "single", and other such terminology. Rather, the use of ordinal numbers is to distinguish between the elements. By way of an example, a first element may be distinct from a second element, and the first element may encompass more than one element and succeed (or precede) the second element in an ordering of elements. As another example, a first element and a second element may be the same type of element, but a different instance of that same type of element. As yet another example, a first element and a second element may be different types of elements.

Methods and systems disclosed herein relate generally to improving the performance of a gas turbine by utilizing available energy while minimizing energy losses, to increase the efficiency of the gas turbine. In example embodiments, improved thermodynamic cycle designs may be retrofitted for industrial, semi-industrials or aero-derivative gas turbines, all of which employ a Brayton cycle using natural gas a fuel. In some embodiments, the gas turbine efficiency may be increased by increasing an axial compressor inlet pressure, which may increase the air mass flow to an optimal limit. Some examples of methods to increase the axial compressor inlet pressure include using the wasted energy of exhaust flue gases (present at the outlet of a turbine section of a gas turbine), using wasted energy of high-pressure fuel gas, and using an electrical motor to drive any air blowers present in an improved gas turbine cycle.

In some example embodiments, both exhaust flue gases and high-pressure fuel gas energy losses may be recovered in the form of an increase in axial compressor air mass flow rate, which is a result of an increase in the inlet pressure of the compressor from atmospheric pressure to a higher pressure, such a 1.2 bar. In these example embodiments, the thermal efficiency of the gas turbine cycle may increase as a function of an increase in the inlet pressure of the compressor.

The term "efficiency" will be used interchangeably with the phrase "thermal efficiency" in the present application.

Gas turbines are engines that convert the chemical energy stored in some types of liquid or gaseous fuels to mechanical energy. The mechanical energy output of a gas turbine may be converted into electricity or power. To achieve the conversion from chemical energy to mechanical energy, gas turbines may utilize several components working together, such as a compressor, a combustor, a turbine, and a fuel injector. The liquid or gaseous fuel may be mixed with pressurized air to initiate a chemical reaction which releases energy inside the combustor of a gas turbine. The temperature and the pressure of the products of this chemical reaction are generally very high. Therefore, the products of the chemical reaction may be used to drive the turbine component of the gas turbine.

The energy levels of air, combustion products, and other gases in a gas turbine are higher than the energy level of atmospheric air in most sections of the gas turbine. These expelled gases contain energy that is not used if the gases are expelled to the atmosphere. This energy that is not used may contribute to energy losses from the gas turbine.

Additionally, the fuel feed is generally at a high pressure and a high energy level before entering the combustor component of the gas turbine. The pressure of the fuel feed may be required to decrease before entering the combustor component. To achieve this decrease in energy of the fuel feed, energy may be transferred to the surroundings. If the surroundings correspond to the atmosphere, this energy transfer from the fuel feed to the surroundings also contributes to energy losses from the gas turbine.

The air that reacts with the liquid or gaseous fuel in one of the components of the gas turbine is pressurized in a compressor component. Generally, the air entering the compressor is at atmospheric pressure. However, the thermal efficiency of the gas turbine may be higher if the air entering the compressor component is at a pressure higher than the atmospheric pressure. Some embodiments discussed herein include systems, processes, and/or methods that allow for capturing at least some of the energy otherwise expelled into the atmosphere. In some such embodiments the energy capture involves increasing the pressure of air entering the compressor component, with the objective of increasing the thermal efficiency and decreasing the energy losses of the gas turbine.

A gas turbine is a power cycle which contains multiple open systems. The open systems may be in series. The objective of a gas turbine is to develop power using the energy released during a chemical reaction in one of the open systems of the gas turbine power cycle. Although the main open systems of the gas turbine are generally connected in series, there is an injection of fuel into one of the components within the gas turbine. While a gas turbine may contain other open systems not described herein, a simple gas turbine generally includes the following open systems connected in series: at least one compressor, followed by a combustor, and followed by at least one turbine.

As mentioned above, a gas turbine is a power cycle which may contain multiple open systems in series. One of the common open systems found in a gas turbine is a turbine which uses gas as the working fluid. However, the phrase "gas turbine" is used in the present disclosure to include all of the open systems and components which make up the gas turbine power cycle. As used herein, the term "turbine" when not modified by the term "gas" is used in its broadest sense to mean a single open system. In contrast, as used herein, the phrase "gas turbine" is used more broadly to mean one or more open systems and/or components which make up a gas turbine power cycle.

A power cycle is a thermodynamic cycle where the net heat transferred to the cycle is positive and the net power of the cycle is positive. For a power cycle, the overall effect in terms of energy transfer is heat transferred from the surroundings to the cycle, and power transferred from the cycle to the surroundings.

The thermal efficiency, $\eta$, of a power cycle is a measure of how much net power, $\dot{W}_{net}$, is developed for the cycle compared to the rate of heat transferred into the power cycle, $\dot{Q}_{in}$. From conservation of energy, because the energy input is equal to the energy output of a cycle, the thermal efficiency may also be expressed in terms of rate of heat losses, $\dot{Q}_{out}$:

$$\eta = \frac{\dot{W}_{net}}{\dot{Q}_{in}} = 1 - \frac{\dot{Q}_{out}}{\dot{Q}_{in}}$$

From the preceding equation, as the heat losses increase for a power cycle, the thermal efficiency decreases. Although other factors contribute to a decrease in the thermal efficiency of a power cycle, such as irreversibilities, isentropic efficiencies, and pressure drops, heat losses is the greatest contributor to the thermal efficiency decrease of a power cycle.

In the following description of FIGS. 1-5, any component described regarding a figure, in various embodiments disclosed herein, may be equivalent to one or more like-named components described with regard to any other figure. For brevity, descriptions of like-named components may not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Figure 1:
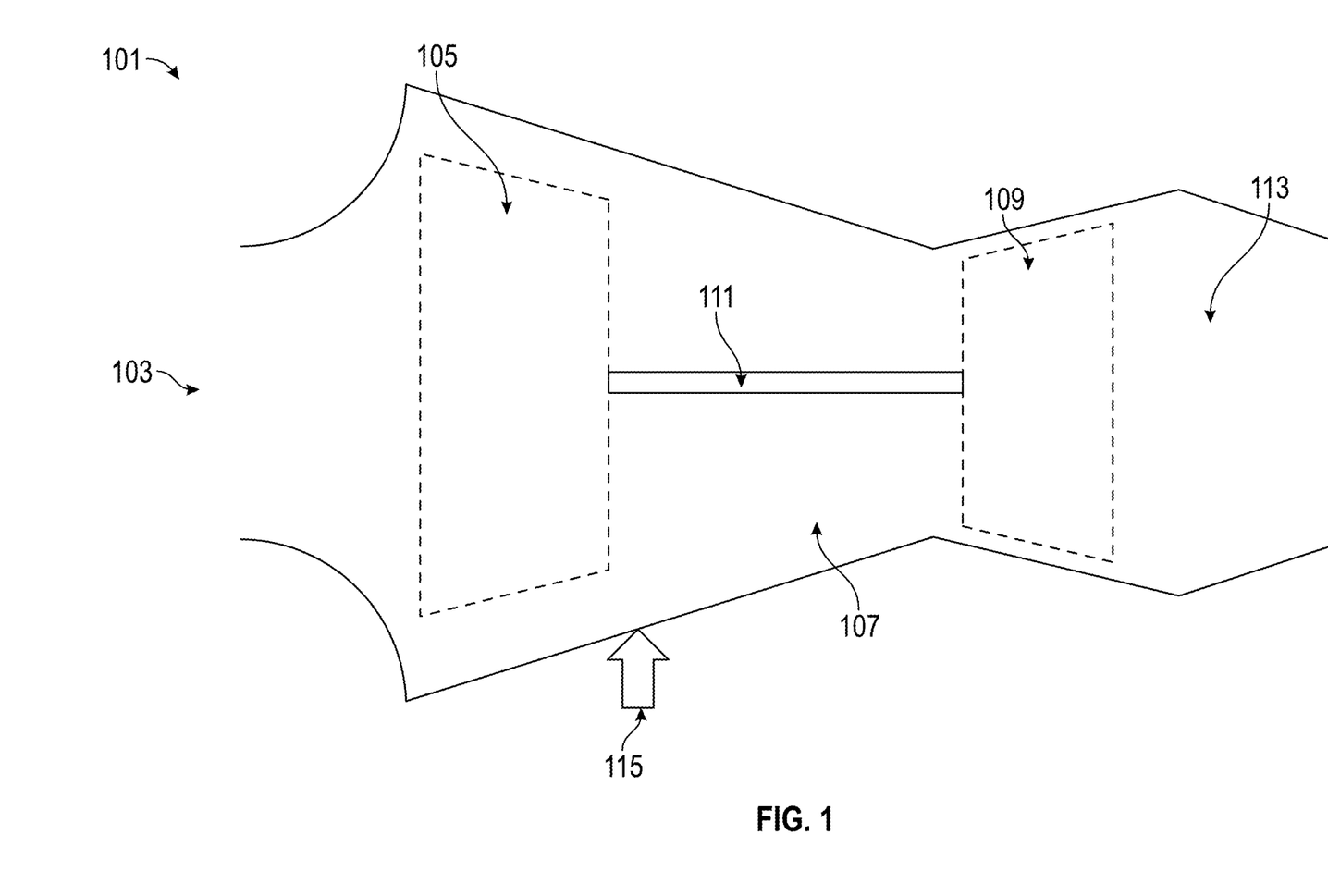
FIG. 1 shows a simple gas turbine including its main sections.

FIG. 1. shows a schematic of a simple gas turbine 101. Simple gas turbine 101 may be used in power plants, refineries, chemical plants, and stationary applications to generate power and electricity. Air enters the simple gas turbine 101 through an air inlet 103 and flows through a compressor section 105. Compressor section 105 may contain one compressor, or multiple compressors, depending on the application. In compressor section 105, air is compressed. During the compression of air in compressor section 105, the pressure and the temperature of the air may increase. The compressed air exiting compressor section 105 passes through a combustion chamber 107. Combustion chamber 107 comprises a fuel injection site 115, through which fuel enters combustion chamber 107. The fuel and the compressed air inside combustion chamber 107 react chemically and produce combustion products which exit combustion chamber 107 and enter a turbine section 109. The combustion products exiting combustion chamber 107 generally have high pressure and high temperature. Turbine section 109 may contain a single turbine or multiple turbines. The combustion products flow through turbine section 109 and expand. The expanded combustion products exiting turbine section 109 contain a lower energy than the combustion products entering turbine section 109. This lower energy may be expressed as lower temperature and lower pressure. Turbine section 109 produces work, which may be used to power compressor section 105. The expanded combustion products exiting turbine section 109 then exit the simple gas turbine 101 through an exhaust section 113. The expanded combustion products exiting through exhaust section 113 generally contain a higher energy level than atmospheric air. This energy level may be expressed as temperature and pressure of the expanded combustion products.

Simple gas turbines 101 may be modified to increase the thermal efficiency of the simple gas turbine 101. Simple gas turbines 101 may also be modified to accommodate the design parameters of a particular application. As mentioned above, the terms gas turbine and turbine differ in the present disclosure.

Figure 2:
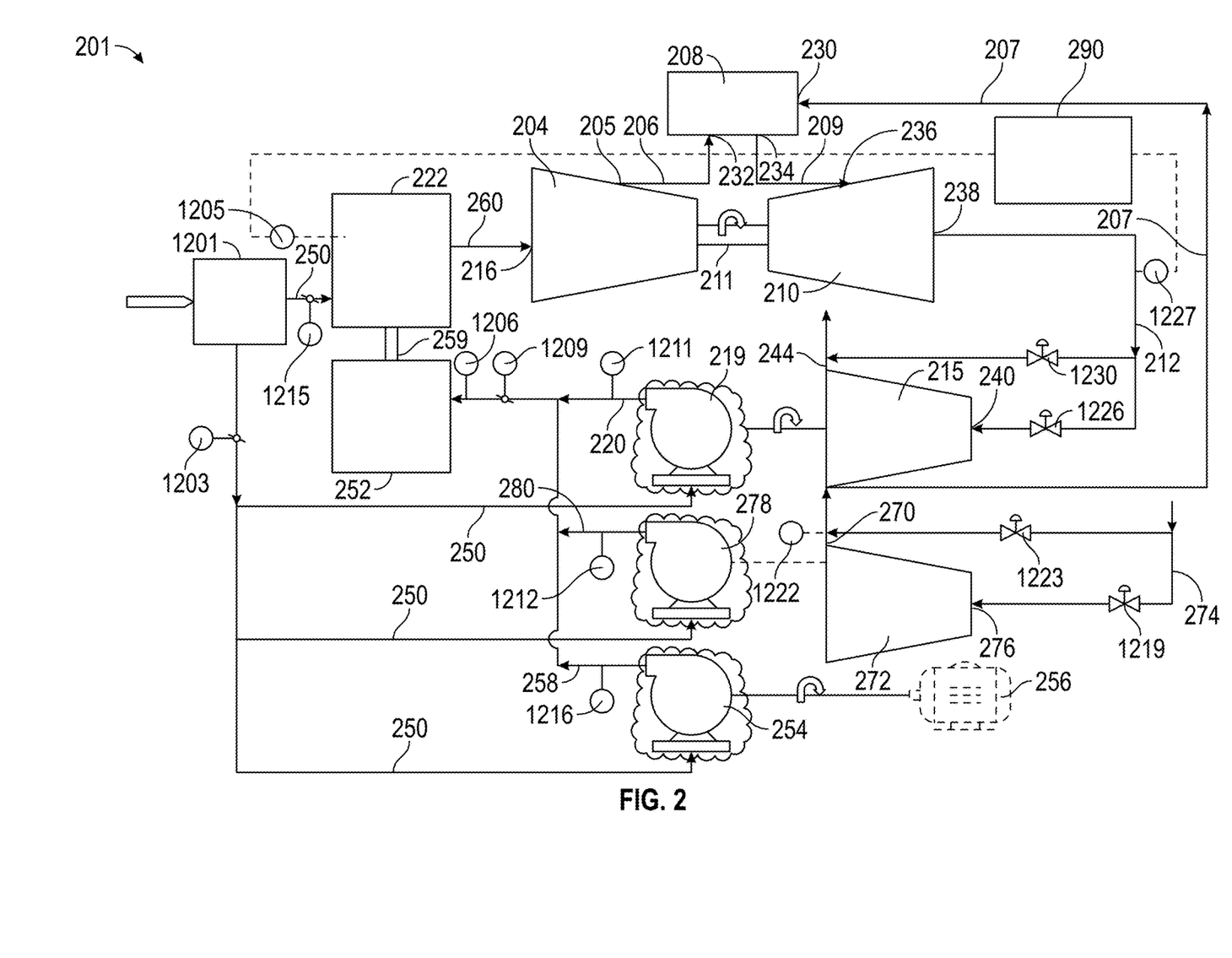
FIG. 2 shows modified gas turbines according to various embodiments.

Turning now to FIG. 2, a modified gas turbine 201 is shown in accordance with some embodiments. A stream of compressor supply air 260 enters a compressor 204 via a compressor inlet 216 at a given temperature and pressure, and is compressed to yield a compressed stream of air 206. Compressed stream of air 206 exits via a compressor outlet 205 at a higher pressure compared to the pressure at compressor inlet 216. Modified gas turbine 201 includes a combustor 208 configured to receive compressed stream of air 206 at a first combustor inlet 232. In addition to receiving compressed stream of air 206, combustor 208 is configured to receive a stream of fuel 207 via a second combustor inlet 230. Combustor 208 facilitates a chemical reaction between compressed stream of air 206 and fuel 207 that yields a stream of combustion products 209. Stream of combustion products 209 exiting combustor 208 may contain a higher temperature than the temperature of compressed stream of air 206.

Fuel 207 entering combustor 208 is received from an outlet 270 of a high-pressure turbocharger 272. As used herein, the phrase "high-pressure turbocharger" may be any turbocharger connected upstream to an inlet of a combustor (e.g., inlet 230 of combustor 208). In contrast, as used herein the phrase "low-pressure turbocharger" may be any turbocharger connected downstream to the outlet of a turbine (e.g., outlet 238 of turbine 210). A pressure sensor 1222 is deployed to sense a pressure of fuel 207 near outlet 270. An output from pressure sensor 1222 controls a fuel inlet valve 1223 to achieve a desired inlet fuel amount and/or pressure from a fuel source 274. High-pressure turbocharger 272 is configured to receive a stream of fuel source 274 at a high energy via an inlet 276, and to output stream of fuel 207 at an energy value lower than the energy of fuel source 274, where fuel 207 contains an appropriate energy value to enter combustor 208. High-pressure turbocharger 272 may be used to provide energy by work to a second air blower 278.

The phrase "energy by work" and the term "power" may be used interchangeably in some embodiments. Power refers to the rate of energy by work transferred during a process or processes.

Fuel 207 entering combustor 208 may be natural gas. Based upon the disclosure provided herein, one of ordinary skill in the art will recognize a variety of fuel types that may be used in relation to different embodiments. Combustor 208 may be a multiple chamber combustor, an annular chamber combustor, or a cannular type of combustor. Based upon the disclosure provided herein, one of ordinary skill in the art will recognize a variety of combustor types that may be used in relation to different embodiments.

Second air blower 278 is an open system that may increase the pressure and temperature of a stream of filtered air 250 entering second air blower 278. A damper valve 1203 connects an air filtration system 1201 to the suction of each of first 219, second air blower 278 and third air blower 254. Second air blower 278 may be a centrifugal blower, a multistage blower, or a positive displacement blower. Based upon the disclosure provided herein, one of ordinary skill in the art will recognize a variety of blower types that may be used in relation to different embodiments.

Second air blower 278 is configured to output a second blower gas stream 280 to a secondary air distribution system 252. Second blower gas stream 280 has a higher energy level than stream of filtered air 250, since high-pressure turbocharger 272 was used to transfer energy to second air blower 278. A pressure sensor 1212 measures and transmits a pressure of second blower gas stream 280.

Secondary air distribution system 252 may be, but is not limited to, an air plenum, a box, or another type of distribution system to redirect air streams to a desired location. Secondary air distribution system 252 may dampen air turbulence generated at the outlets of air blowers. Based upon the disclosure provided herein, one of ordinary skill in the art will recognize a variety of air distribution types that may be used in relation to different embodiments. Secondary air distribution system 252 may be used to ensure that any turbulent flow which might occur after one or more of first air blower 219, second air blower 278, and/or third air blower 254 does not reach the primary air plenum to avoid any possible axial compressor stall. As more fully discussed below, operation of first air blower 219, second air blower 278, and third air blower 254 may be based at least in part on the pressure sensed by a pressure sensor 1206.

Keeping with FIG. 2, stream of combustion products 209 exiting combustor 208 is provided to a turbine 210 via a turbine inlet 236. Turbine 210 may contain blades attached to a rotatable shaft 211. Rotatable shaft 211 may be used to drive compressor 204, and may also be connected to a power generator or another system (not shown). The stream of combustion products 209 enters turbine 210 and expands. During the expansion process, the energy of stream of combustion products 209 decreases. An expanded stream of combustion products 212 (at a decreased energy than that of stream of combustion products 209) exits turbine 210 via a turbine outlet 238.

According to embodiments, a difference in energy level may refer to a difference in enthalpy. A difference in energy level may also refer to a difference in internal energy. Furthermore, a difference in energy level may refer to a difference in temperature. In some cases, a difference in energy level may refer to a difference in pressure.

Although expanded stream of combustion products 212 exiting turbine 210 has a lower energy level compared to stream of combustion products 209 entering turbine 210, expanded stream of combustion products 212 generally has a higher energy than atmospheric air. In some conventional systems, expanded stream of combustion products 212 is exhausted to the atmosphere via a valve 1230, and their energy is not utilized. In some embodiments, valve 1230 is configured to control the exhaust pressure of turbine 210. In some embodiments, a pressure sensor 1227 near the output of turbine 210 measures and transmits a pressure of expanded stream of combustion products 212. In this embodiment, expanded stream of combustion products 212 can be exhausted to the atmosphere via a valve 1230 based upon a pressure sensed by pressure sensor 1227.

In contrast to conventional systems, expanded stream of combustion products 212 exiting turbine 210 may be used in some embodiments to transfer energy to other streams of fluid in a manner that may be useful and that may increase the thermal efficiency of the gas turbine. This is done by allowing at least a portion of expanded stream of combustion products 212 exiting turbine 210 to enter a low-pressure turbocharger 215 via a low-pressure turbocharger inlet 240. A valve 1226 is opened to allow at least a portion of expanded stream of combustion products 212 to enter low-pressure turbocharger 215. In some embodiments, valve 1226 is controlled based upon pressure sensor 1206 to govern the speed of low-pressure turbocharger 215.

In FIG. 2, low-pressure turbocharger inlet 240 is fluidly coupled downstream of outlet 238 of turbine 210. Expanded stream of combustion products 212 exiting turbine 210 enters low-pressure turbocharger 215 at a high energy level, and exits low-pressure turbocharger 215 at a lower energy level via a low-pressure turbocharger outlet 244. Low-pressure turbocharger 215 is used to provide energy by work to a first air blower 219. First air blower 219 is an open system that may increase the pressure and velocity of a stream of filtered air 250 entering first air blower 219. First air blower 219 may be a centrifugal blower, a multistage blower, or a positive displacement blower. Based upon the disclosure provided herein, one of ordinary skill in the art will recognize a variety of blower types that may be used in relation to different embodiments.

First air blower 219 is configured to output a first blower gas stream 220 to secondary air distribution system 252. First blower gas stream 220 has a higher energy level than stream of filtered air 250, since low-pressure turbocharger 215 was used to transfer energy to first air blower 219.

A third air blower 254 is configured to increase the pressure and the velocity of stream of filtered air 250 entering third air blower 254. An electric motor 256 is used to provide energy by work to third air blower 254. Third air blower 254 is also configured to output third blower gas stream 258 to enter secondary air distribution system 252. Pressure sensor 1206 senses a pressure of air flowing into secondary air distribution system 252. A damper valve 1209 controls air flow to air distribution system 252 and is controlled based on the pressure sensed by pressure sensor 1206. A pressure sensor 1216 measures and transmits a pressure of third blower gas stream 258.

Secondary air distribution system 252 is configured to receive first blower gas stream 220, third blower gas stream 258, and second blower gas stream 280. In some embodiments, all of the blower gas streams may be inputs for secondary air distribution system 252. In other embodiments, one or more of the blower gas streams may be used as inputs for secondary air distribution system 252. Secondary air distribution system 252 outputs a stream of energized air 259. The energy of stream of energized air 259 is higher than the energy of the streams of filtered air 250.

Keeping with FIG. 2, primary air distribution system 222 is fluidly coupled downstream secondary air distribution system 252. Primary air distribution system 222 is configured to receive energized stream of air 259 and a separate stream of filtered air 250. In some embodiments, primary air distribution system 222 may have stream of filtered air 250 as the only input. In other embodiments, primary air distribution system 222 may have stream of energized air 259 as the only input. In other embodiments, primary air distribution system 222 may have both stream of filtered air 250 via a damper valve 1215 and stream of energized air 259 as inputs. Primary air distribution system 222 is configured to output stream of compressor supply air 260.

Stream of compressor supply air 260 may have a higher energy than atmospheric air, such that the thermal efficiency of modified gas turbine 201 may be higher than the thermal efficiency of a gas turbine which uses compressor supply air at atmospheric conditions. Thus, in some embodiments, energy losses diminish in modified gas turbine 201 and the thermal efficiency increases. Additionally, the pressure ratio for compressor 204 may decrease, as stream of compressor supply air 260 has a higher pressure than atmospheric pressure. A decrease in pressure ratio for compressor 204 may result in higher thermal efficiency for modified gas turbine 201. Based upon the disclosure provided herein, one of ordinary skill in the art will recognize a variety of advantages in addition to or in place of any advantages implied herein that may be achieved through use of a modified gas turbine similar to that discussed in FIG. 2.

A turbine control process logic controller (PLC) 290 may be integrated into modified gas turbine 201 to determine when each blower (i.e., which of first air blower 219, second air blower 278, and/or third air blower 254) should be turned on. Turbine PLC 290 includes implements operational logic to govern operation of modified gas turbine 201. Further, turbine PLC 290 includes capability of receiving pressures measured by pressure sensors 1205, 1206, 1222, 1227, 1211, 1212, 1216. Additionally, turbine PLC 290 includes capability of to control one or more of damper valve 1209, damper valve 1215, damper valve 1209, valve 1219, valve 1223, valve 1226, valve 1203, and valve 1230. Turbine PLC 290 may be any programmable logic controller or other computerized controller known in the art.

As an example, the operational logic implemented by turbine PLC 290 for modified gas turbine 201 may be implemented as follows.

During startup of modified gas turbine 201, stream of filtered air 250 enters primary air distribution system 222 as the only input. Primary air distribution system 222 outputs stream of compressor supply 260 to inlet 216 of compressor 204.

After startup, once modified gas turbine 201 has reached a desired speed, electric motor 256 is engaged causing third air blower 254 to output third blower gas stream 258 to secondary air distribution system 252. In some embodiments, the desired speed may be a user programmable variable. In other embodiments, the desired speed may be a fixed speed value. Secondary air distribution system 252 will output stream of energized air 259 to primary air distribution system 222. At this time, primary air distribution system 222 has inputs of filtered air 250 and stream of energized air 259.

While third air blower 254 is in operation, first air blower 219 is powered by low-pressure turbocharger 215. First air blower 219 will output first blower gas stream 220 to secondary air distribution system 252. Once first air blower 219 is running, third air blower 254 will be turned off. Secondary air distribution system 252 will receive first blower gas stream 220, and will output stream of energized air 259 to primary air distribution system 222. At this time, primary air distribution system 222 has inputs of filtered air 250 and stream of energized air 259, and outputs stream of compressor supply air 260 to compressor 204.

Once first air blower 219 is the only air blower running in modified gas turbine 201, the pressure of compressor supply air 260 will be measured. If the pressure of supply air 260 is below a target pressure, second air blower 278 will be turned on. In some embodiments, the target pressure is between 1.1 and 1.2 bar. Based upon the disclosure provided herein, one of ordinary skill in the art will recognize other target pressures that may be used in relation to different embodiments. Second air blower 278 is powered by high-pressure turbocharger 272. Stream of filtered air 250 will enter second air blower 278. Second blower gas stream 280 exits second air blower 278 and is directed to secondary air distribution system 252. At this time, secondary air distribution system 252 has two inputs: second blower gas stream 280 and first blower gas stream 220. Secondary air distribution system 252 outputs stream of energized air 259 to first air distribution system 250, which outputs stream of compressor supply air 260 to compressor 204.

Next, the pressure of compressor supply air 260 will be measured again. If the pressure of compressor supply air 260 is below the desired minimum pressure, third air blower 254 will be turned on again, delivering third blower gas stream 258 to secondary air distribution system 252. At this time, secondary air distribution system 252 has three inputs: first blower gas stream 220, second blower gas stream 280, and third blower gas stream 258. Secondary air distribution system 252 outputs stream of energized air 259 to first air distribution system 250, which outputs stream of compressor supply air 260 to compressor 204.

During running of modified gas turbine 201, while the pressure inside of primary air distribution system 250 is greater than atmospheric pressure, a valve (not shown) will preclude stream of filtered air 250 from entering primary air distribution system 222. However, if the pressure inside primary air distribution system 250 is lower than atmospheric pressure, stream of filtered air 250 will continue to enter primary air distribution system 222 to increase the pressure to at least atmospheric pressure.

Figure 3:
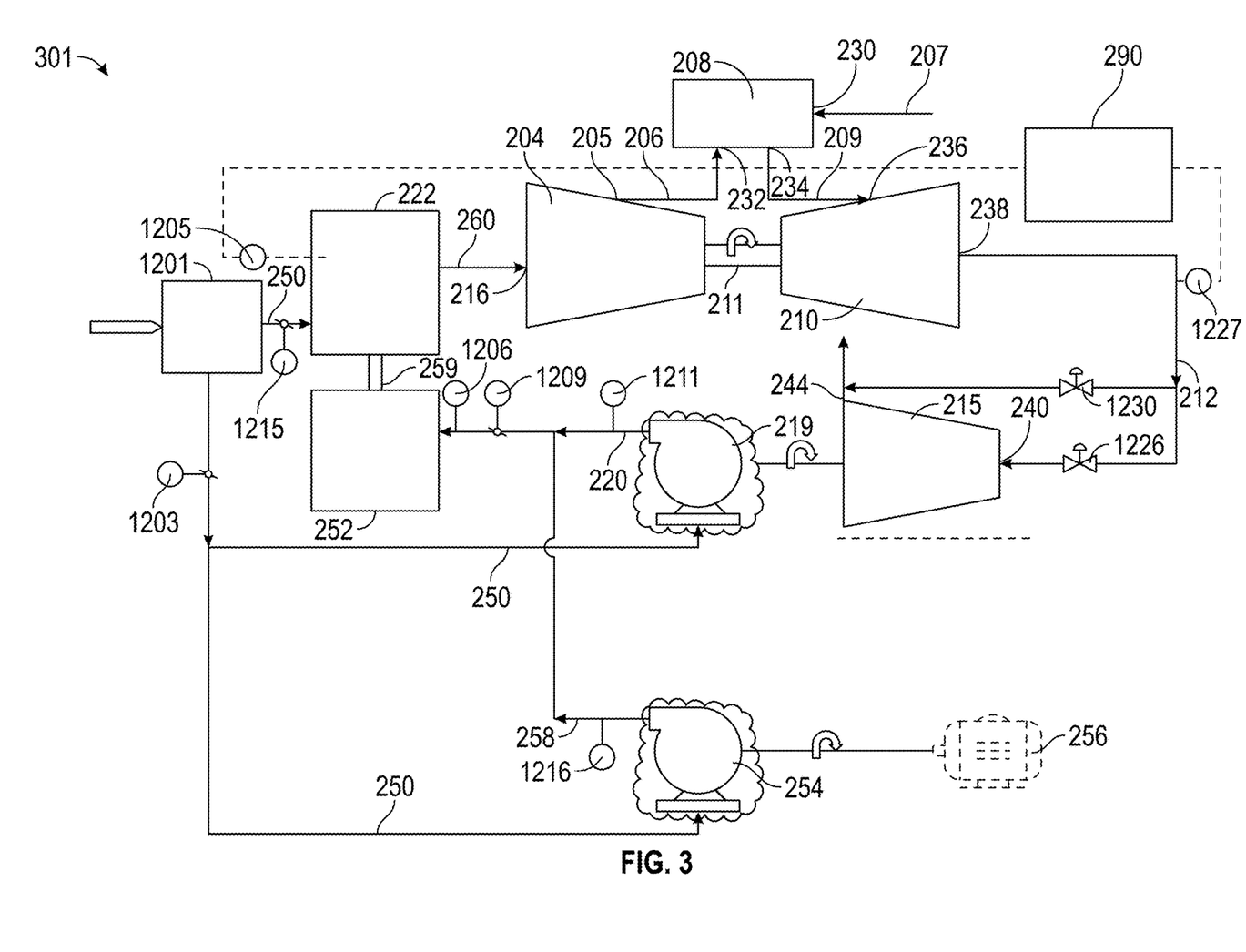
FIG. 3 shows another modified gas turbines according to some embodiments.

Turning now to FIG. 3, a modified gas turbine 301 is shown in accordance with some embodiments. Stream of compressor supply air 260 enters compressor 204 via compressor inlet 216 at a given temperature and pressure, and is compressed to yield compressed stream of air 206. Compressed stream of air 206 exits via compressor outlet 205 at a higher pressure compared to the pressure at compressor inlet 216. Modified gas turbine 301 includes combustor 208 configured to receive compressed stream of air 206 at first combustor inlet 232. In addition to receiving compressed stream of air 206, combustor 208 is configured to receive stream of fuel 207 via a second combustor inlet 230. Combustor 208 facilitates a chemical reaction between compressed stream of air 206 and fuel 207 that yields stream of combustion products 209. Stream of combustion products 209 exiting combustor 208 may contain a higher temperature than the temperature of compressed stream of air 206.

Fuel 207 entering combustor 208 may be natural gas. Based upon the disclosure provided herein, one of ordinary skill in the art will recognize a variety of fuel types that may be used in relation to different embodiments. Combustor 208 may be a multiple chamber combustor, an annular chamber combustor, or a cannular type of combustor. Based upon the disclosure provided herein, one of ordinary skill in the art will recognize a variety of combustor types that may be used in relation to different embodiments.

Stream of combustion products 209 exiting combustor 208 is provided to turbine 210 via turbine inlet 236. Turbine 210 may contain blades attached to rotatable shaft 211. Rotatable shaft 211 may be used to drive compressor 204, and may also be connected to a power generator or another system (not shown). The stream of combustion products 209 enters turbine 210 and expands. During the expansion process, the energy of stream of combustion products 209 decreases. Expanded stream of combustion products 212 (at a decreased energy than that of stream of combustion products 209) exits turbine 210 via a turbine outlet 238.

According to embodiments, a difference in energy level may refer to a difference in enthalpy. A difference in energy level may also refer to a difference in internal energy. Furthermore, a difference in energy level may refer to a difference in temperature. In some cases, a difference in energy level may refer to a difference in pressure.

Although expanded stream of combustion products 212 exiting turbine 210 has a lower energy level compared to stream of combustion products 209 entering turbine 210, expanded stream of combustion products 212 generally has a higher energy than atmospheric air. In some conventional systems, expanded stream of combustion products 212 is exhausted to the atmosphere, and their energy is not utilized. A pressure sensor 1227 measures and transmits a pressure of expanded stream of combustion products 212. In this embodiment, expanded stream of combustion products 212 can be exhausted to the atmosphere via a valve 1230 based upon a pressure sensed by pressure sensor 1227. In contrast to conventional systems, expanded stream of combustion products 212 exiting turbine 210 may be used in some embodiments to transfer energy to other streams of fluid in a manner that may be useful and that may increase the thermal efficiency of the gas turbine. Expanded stream of combustion products 212 exiting turbine 210 enters low-pressure turbocharger 215 via low-pressure turbocharger inlet 240.

In FIG. 3, low-pressure turbocharger inlet 240 is fluidly coupled downstream of outlet 238 of turbine 210. Expanded stream of combustion products 212 exiting turbine 210 enters low-pressure turbocharger 215 at a high energy level, and exits low-pressure turbocharger 215 at a lower energy level via a low-pressure turbocharger outlet 244. Low-pressure turbocharger 215 is used to provide energy by work to first air blower 219. First air blower 219 is an open system that may increase the pressure and velocity of a stream of filtered air 250 entering first air blower 219. First air blower 219 may be a centrifugal blower, a multistage blower, or a positive displacement blower. Based upon the disclosure provided herein, one of ordinary skill in the art will recognize a variety of blower types that may be used in relation to different embodiments.

First air blower 219 is configured to output first blower gas stream 220 to secondary air distribution system 252.

Secondary air distribution system 252 may be, but is not limited to, an air plenum, a box, or another type of distribution system to redirect air streams to a desired location. Secondary air distribution system 252 may dampen air turbulence generated at the outlets of air blowers. Based upon the disclosure provided herein, one of ordinary skill in the art will recognize a variety of air distribution types that may be used in relation to different embodiments. First blower gas stream 220 has a higher energy level than stream of filtered air 250, since low-pressure turbocharger 215 was used to transfer energy to first air blower 219.

Third air blower 254 is configured to increase the pressure and the velocity of a stream of filtered air 250 entering third air blower 254. Electric motor 256 is used to provide energy by work to third air blower 254. Third air blower is also configured to output third blower gas stream 258 to enter secondary air distribution system 252.

Secondary air distribution system 252 is configured to receive first blower gas stream 220 and third blower gas stream 258. In some embodiments, all of the blower gas streams may be inputs for secondary air distribution system 252. In other embodiments, one or more of the blower gas streams may be used as inputs for secondary air distribution system 252. Secondary air distribution system 252 outputs stream of energized air 259. The energy of stream of energized air 259 is higher than the energy of the streams of filtered air 250.

Keeping with FIG. 3, primary air distribution system 222 is fluidly coupled downstream secondary air distribution system 252. Primary air distribution system 222 is configured to receive energized stream of air 259 and a separate stream of filtered air 250. In some embodiments, primary air distribution system 222 may have stream of filtered air 250 as the only input. In other embodiments, primary air distribution system 222 may have stream of energized air 259 as the only input. In other embodiments, primary air distribution system 222 may have both stream of filtered air 250 and stream of energized air 259 as inputs. Primary air distribution system 222 is configured to output stream of compressor supply air 260.

Stream of compressor supply air 260 may have a higher energy than atmospheric air, such that the thermal efficiency of modified gas turbine 301 may be higher than the thermal efficiency of a gas turbine which uses a compressor supply air at atmospheric conditions. Thus, in some embodiments, energy losses diminish in modified gas turbine 301 and the thermal efficiency increases. Additionally, the pressure ratio for compressor 204 may decrease, as stream of compressor supply air 260 has a higher pressure than atmospheric pressure. A decrease in pressure ratio for compressor 204 may result in higher thermal efficiency for modified gas turbine 301. Based upon the disclosure provided herein, one of ordinary skill in the art will recognize a variety of advantages in addition to or in place of any advantages implied herein that may be achieved through use of a modified gas turbine similar to that discussed in FIG. 3.

A turbine control process logic configuration (PLC) 290 may be integrated into modified gas turbine 301 to determine when each blower (i.e., which of first air blower 219, and/or third air blower 254) should be turned on. Turbine PLC 290 implements operational logic to govern operation of modified gas turbine 301.

As an example, the operational logic implemented by turbine PLC 290 for modified gas turbine 301 may be implemented as follows.

During the modified gas turbine 301 startup, stream of filtered air 250 enters primary air distribution system 222 as the only input. Primary air distribution system outputs stream of compressor supply 260 to inlet 216 of compressor 204.

After startup, once modified gas turbine 301 has reached a desired speed, electric motor 256 is engaged causing third air blower 254 to output third blower gas stream 258 to secondary air distribution system 252. In some embodiments, the desired speed may be a user programmable variable. In other embodiments, the desired speed may be a fixed speed value. Secondary air distribution system 252 will output stream of energized air 259 to primary air distribution system 222. At this time, primary air distribution system 222 has inputs of filtered air 250 and stream of energized air 259.

While third air blower 254 is in operation, first air blower 219 is powered by low-pressure turbocharger 215. First air blower 219 will output first blower gas stream 220 to secondary air distribution system 252. Once first air blower 219 is running, third air blower 254 will be turned off. Secondary air distribution system 252 will receive first blower gas stream 220, and will output stream of energized air 259 to primary air distribution system 222. At this time, primary air distribution system 222 has inputs of filtered air 250 and stream of energized air 259, and outputs stream of compressor supply air 260 to compressor 204.

Once first air blower 219 is the only air blower running in modified gas turbine 301 (i.e., third air blower 254 is not operating), the pressure of compressor supply air 260 will be measured. If the pressure of compressor supply air 260 is below a target pressure, electric motor 256 will be re-engaged causing third air blower 254 to turn on again, delivering third blower gas stream 258 to secondary air distribution system 252. In some embodiments, the target pressure is between 1.1 and 1.2 bar. Based upon the disclosure provided herein, one of ordinary skill in the art will recognize other target pressures that may be used in relation to different embodiments. At this time, secondary air distribution system 252 has two inputs: first blower gas stream 220, and third blower gas stream 258. Secondary air distribution system 252 outputs stream of energized air 259 to first air distribution system 250, which outputs stream of compressor supply air 260 to compressor 204.

During running of modified gas turbine 301, while the pressure inside of primary air distribution system 250 is greater than atmospheric pressure, a valve (not shown) will preclude stream of filtered air 250 from entering primary air distribution system 250. However, if the pressure inside primary air distribution system 250 is lower than atmospheric pressure, stream of filtered air 250 will continue to enter primary air distribution system 222 to increase the pressure to at least atmospheric pressure.

Figure 4:
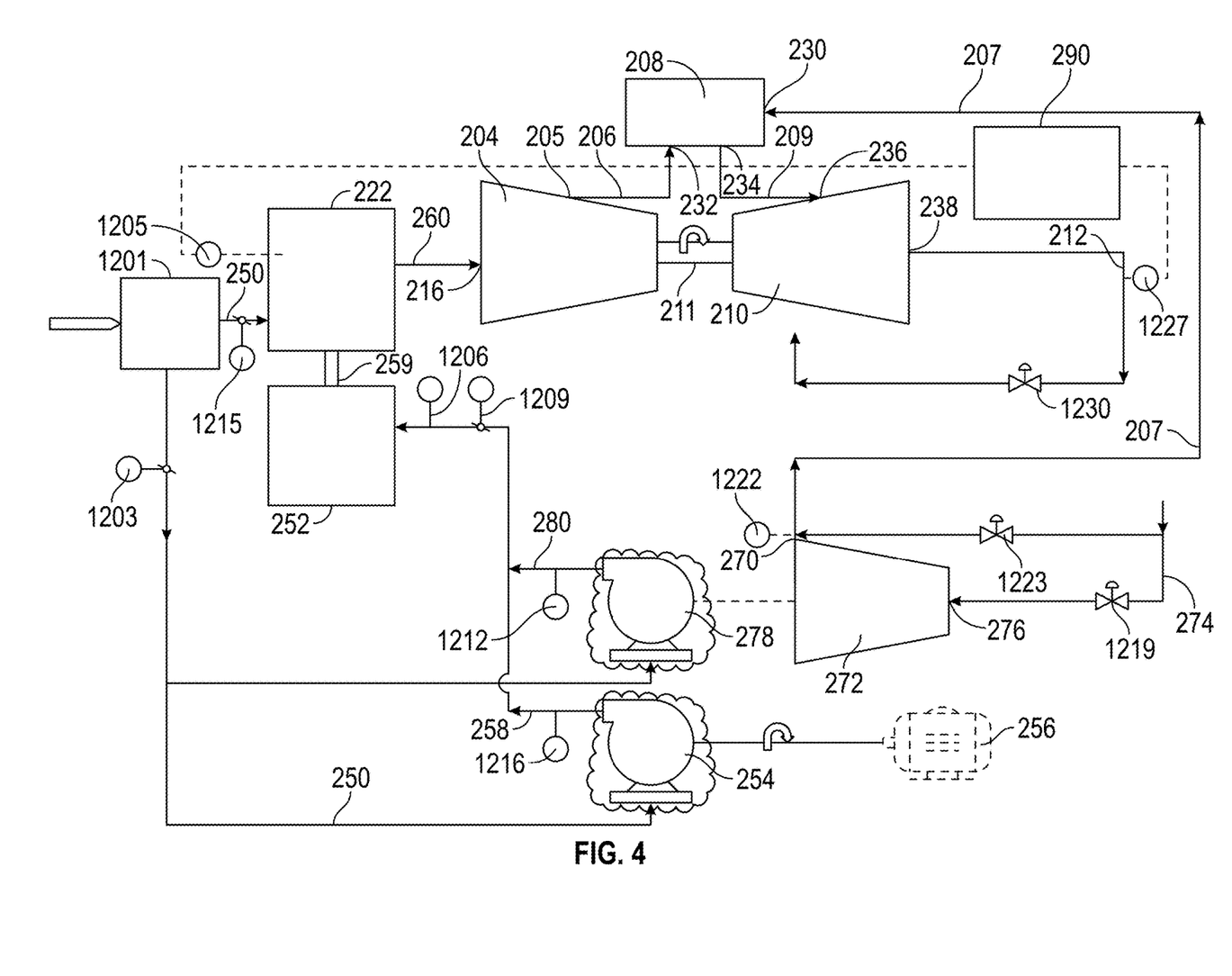
FIG. 4 shows another modified gas turbine according to various embodiments.

Turning now to FIG. 4, a modified gas turbine 401 is shown in accordance with some embodiments. Stream of compressor supply air 260 enters a compressor 204 via compressor inlet 216 at a given temperature and pressure, and is compressed to yield compressed stream of air 206. Compressed stream of air 206 exits via compressor outlet 205 at a higher pressure compared to the pressure at compressor inlet 216. Modified gas turbine 401 includes combustor 208 configured to receive compressed stream of air 206 at first combustor inlet 232. In addition to receiving compressed stream of air 206, combustor 208 is configured to receive stream of fuel 207 via second combustor inlet 230. Combustor 208 facilitates a chemical reaction between compressed stream of air 206 and fuel 207 that yields a stream of combustion products 209. Stream of combustion products 209 exiting combustor 208 may contain a higher temperature than the temperature of compressed stream of air 206.

Fuel 207 entering combustor 208 is received from an outlet 270 of high-pressure turbocharger 272. Pressure sensor 1222 is deployed to sense a pressure of fuel 207 near outlet 270. An output from pressure sensor 1222 controls a fuel inlet valve 1223 to achieve a desired inlet fuel amount from a fuel source 274. High-pressure turbocharger 272 is configured to receive stream of fuel source 274 at a high energy via inlet 276, and to output stream of fuel 207 at an energy value lower than the energy of fuel source 274, where fuel 207 contains an appropriate energy value to enter combustor 208. High-pressure turbocharger 272 may be used to provide energy by work to second air blower 278.

Fuel 207 entering combustor 208 may be natural gas. Based upon the disclosure provided herein, one of ordinary skill in the art will recognize a variety of fuel types that may be used in relation to different embodiments. Combustor 208 may be a multiple chamber combustor, an annular chamber combustor, or a cannular type of combustor. Based upon the disclosure provided herein, one of ordinary skill in the art will recognize a variety of combustor types that may be used in relation to different embodiments.

Second air blower 278 is an open system that may increase the pressure and temperature of stream of filtered air 250 entering second air blower 278. Second air blower 278 may be a centrifugal blower, a multistage blower, or a positive displacement blower. Based upon the disclosure provided herein, one of ordinary skill in the art will recognize a variety of blower types that may be used in relation to different embodiments.

Second air blower 278 is configured to output second blower gas stream 280 to secondary air distribution system 252. Second blower gas stream 280 has a higher energy level than stream of filtered air 250, since high-pressure turbocharger 272 was used to transfer energy to second air blower 278. Secondary air distribution system 252 may be, but is not limited to, an air plenum, a box, or another type of distribution system to redirect air streams to a desired location. Secondary air distribution system 252 may dampen air turbulence generated at the outlets of air blowers. Secondary air distribution system 252 may be used to ensure that any turbulent flow which might occur after one or more of second air blower 278 and/or third air blower 254 does not reach the primary air plenum to avoid any possible axial compressor stall. As more fully discussed below, operation of second air blower 278 and third air blower 254 is based at least in part on the pressure sensed by a pressure sensor 1206.

Based upon the disclosure provided herein, one of ordinary skill in the art will recognize a variety of air distribution types that may be used in relation to different embodiments.

Keeping with FIG. 4, stream of combustion products 209 exiting combustor 208 is provided to a turbine 210 via a turbine inlet 236. Turbine 210 may contain blades attached to a rotatable shaft 211. Rotatable shaft 211 may be used to drive compressor 204, and may also be connected to a power generator or another system (not shown). The stream of combustion products 209 enters turbine 210 and expands. During the expansion process, the energy of stream of combustion products 209 decreases. An expanded stream of combustion products 212 (at a decreased energy than that of stream of combustion products 209) exits turbine 210 via a turbine outlet 238.

Again, a difference in energy level may refer to a difference in enthalpy. A difference in energy level may also refer to a difference in internal energy. Furthermore, a difference in energy level may refer to a difference in temperature. In some cases, a difference in energy level may refer to a difference in pressure.

Although expanded stream of combustion products 212 exiting turbine 210 has a lower energy level compared to stream of combustion products 209 entering turbine 210, expanded stream of combustion products 212 generally has a higher energy than atmospheric air. A pressure sensor 1227 measures and transmits a pressure of expanded stream of combustion products 212. In this embodiment, expanded stream of combustion products 212 can be exhausted to the atmosphere via a valve 1230 based upon a pressure sensed by pressure sensor 1227.

Third air blower 254 is configured to increase the pressure and the velocity of stream of filtered air 250 entering third air blower 254. An electric motor 256 is used to provide energy by work to third air blower 254. Third air blower 254 is also configured to output third blower gas stream 258 to enter secondary air distribution system 252. Pressure sensor 1206 senses a pressure of air flowing into secondary air distribution system 252. A damper valve 1209 controls air flow to air distribution system 252 and is controlled based on the pressure sensed by pressure sensor 1206. Secondary air distribution system 252 is configured to receive third blower gas stream 258 and second blower gas stream 280. In some embodiments, all of the blower gas streams may be inputs for secondary air distribution system 252. In other embodiments, one or more of the blower gas streams may be used as inputs for secondary air distribution system 252. Secondary air distribution system 252 outputs stream of energized air 259. The energy of stream of energized air 259 is higher than the energy of the streams of filtered air 250.

Keeping with FIG. 4, primary air distribution system 222 is fluidly coupled downstream secondary air distribution system 252. Primary air distribution system 222 is configured to receive energized stream of air 259 and a separate stream of filtered air 250. In some embodiments, primary air distribution system 222 may have stream of filtered air 250 as the only input. In other embodiments, primary air distribution system 222 may have stream of energized air 259 as the only input. In other embodiments, primary air distribution system 222 may have both stream of filtered air 250 and stream of energized air 259 as inputs. Primary air distribution system 222 is configured to output stream of compressor supply air 260.

Stream of compressor supply air 260 may have a higher energy than atmospheric air, such that the thermal efficiency of modified gas turbine 401 may be higher than the thermal efficiency of a gas turbine which uses compressor supply air at atmospheric conditions. Thus, in some embodiments, energy losses diminish in modified gas turbine 201 and the thermal efficiency increases. Additionally, the pressure ratio for compressor 204 decreases, as stream of compressor supply air 260 has a higher pressure than atmospheric pressure. A decrease in pressure ratio for compressor 204 may result in higher thermal efficiency for modified gas turbine 401. Based upon the disclosure provided herein, one of ordinary skill in the art will recognize a variety of advantages in addition to or in place of any advantages implied herein that may be achieved through use of a modified gas turbine similar to that discussed in FIG. 4.

A turbine control process logic configuration (PLC) 290 may be integrated into modified gas turbine 401 to determine when each blower (i.e., which of second air blower 278, and/or third air blower 254) should be turned on.

Turbine PLC 290 implements operational logic to govern operation of modified gas turbine 401.

As an example, the operational logic implemented by turbine PLC 290 for modified gas turbine 401 may be implemented as follows.

During startup of modified gas turbine 401, stream of filtered air 250 enters primary air distribution system 222 as the only input. Primary air distribution system 222 outputs stream of compressor supply 260 to inlet 216 of compressor 204.

After startup, once modified gas turbine 401 has reached a desired speed, electric motor 256 is engaged causing third air blower 254 to output third blower gas stream 258 to secondary air distribution system 252. In some embodiments, the desired speed may be a user programmable variable. In other embodiments, the desired speed may be a fixed speed value. Secondary air distribution system 252 will output stream of energized air 259 to primary air distribution system 222. At this time, primary air distribution system 222 has inputs of filtered air 250 and stream of energized air 259.

While third air blower 254 is in operation, second air blower 278 is powered by high-pressure turbocharger 272. Second air blower 278 will output a second blower gas stream 280 to secondary air distribution system 252. Once second air blower 278 is running, third air blower 254 will be turned off. Secondary air distribution system 252 will receive second blower gas stream 280, and will output stream of energized air 259 to primary air distribution system 222. At this time, primary air distribution system 222 has inputs of filtered air 250 and stream of energized air 259, and outputs stream of compressor supply air 260 to compressor 204.

Once second air blower 278 is the only air blower running in modified gas turbine 401, the pressure of compressor supply air 260 will be measured. If the pressure of supply air 260 is below a target pressure, third air blower 254 will be turned on again, delivering third blower gas stream 258 to secondary air distribution system 252. In some embodiments, the target pressure is between 1.1 and 1.2 bar. Based upon the disclosure provided herein, one of ordinary skill in the art will recognize other target pressures that may be used in relation to different embodiments. At this time, secondary air distribution system 252 has two inputs: second blower gas stream 280, and third blower gas stream 258. Secondary air distribution system 252 outputs stream of energized air 259 to first air distribution system 250, which outputs stream of compressor supply air 260 to compressor 204.

During running of modified gas turbine 401, while the pressure inside of primary air distribution system 250 is greater than atmospheric pressure, a valve (not shown) will preclude stream of filtered air 250 from entering primary air distribution system 222. However, if the pressure inside primary air distribution system 250 is lower than atmospheric pressure, stream of filtered air 250 will continue to enter primary air distribution system 222 to increase the pressure to at least atmospheric pressure.

Figure 5:
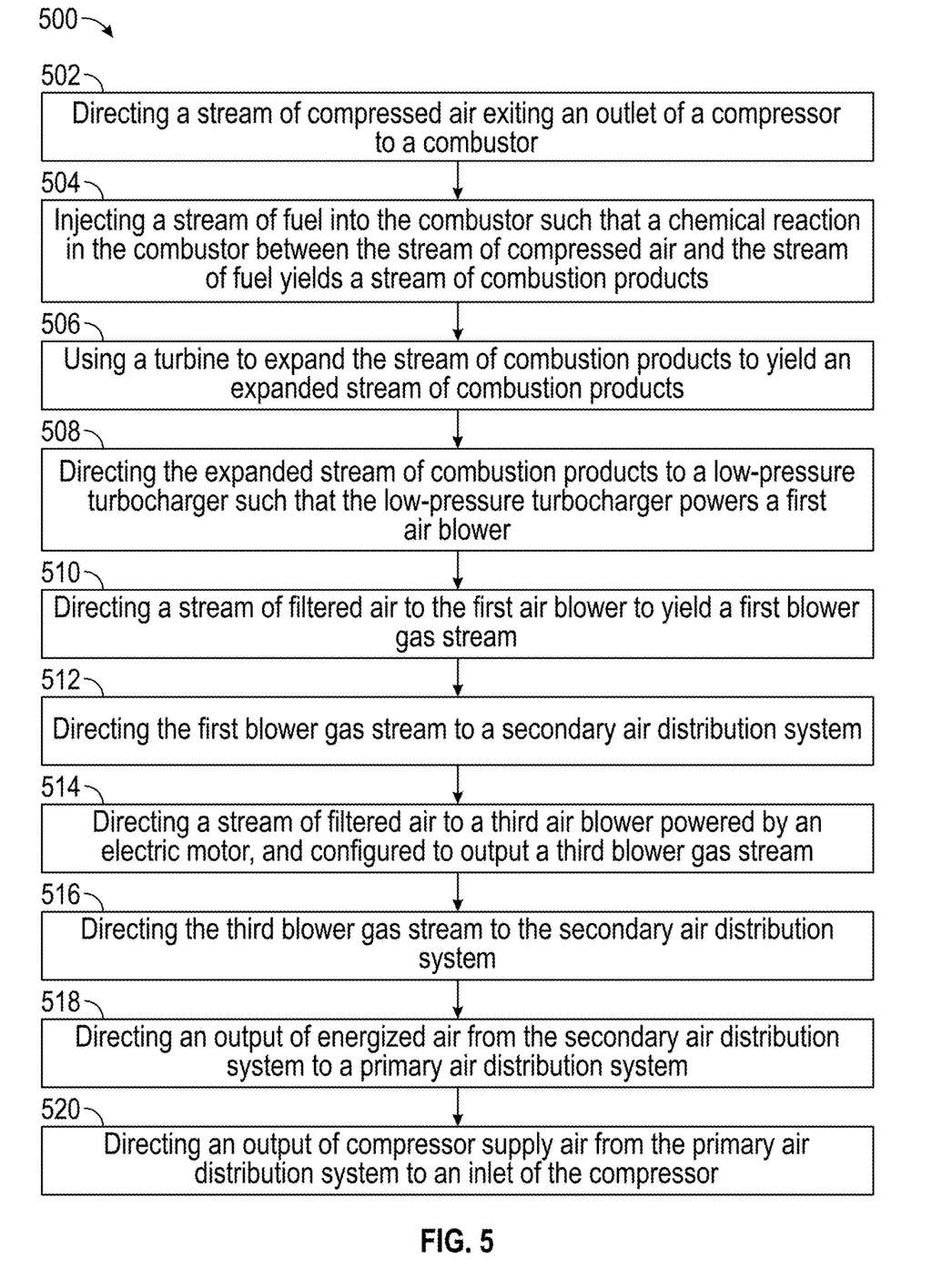
FIG. 5 is a flow diagram showing a method used to improve the efficiency of a gas turbine according to some embodiments.

Turning to FIG. 5, a flow diagram 500 shows a method in accordance with some embodiments where only the first air blower and the third air blower are used similar to that shown in FIG. 3 above. Following flow diagram 500, a stream of compressed air exiting an outlet of a compressor is directed to a combustor (block 502). A stream of fuel is injected into the combustor (block 504). A chemical reaction occurs in the combustor between the stream of fuel and the stream of compressed air yielding a stream of combustion products. A turbine is used to expand the stream of combustion products to yield an expanded stream of combustion products (block 506). The expanded stream of combustion products is directed to a low-pressure turbocharger configured to power a first air blower (block 508). The low-pressure turbocharger charges a stream of filtered air to yield a first blower gas stream (block 510). The first blower gas stream is sent to a secondary air distribution system (block 512). Another stream of filtered air is sent to a third air blower, which is powered by an electric motor. The third air blower outputs a third blower gas stream (block 514) which is sent to the secondary air distribution system (block 516). The secondary air distribution system outputs a stream of energized air, which is sent to a primary air distribution system (block 518). The primary air distribution system outputs a compressor supply air stream, which is directed to an inlet of the compressor (block 520).

Figure 6:
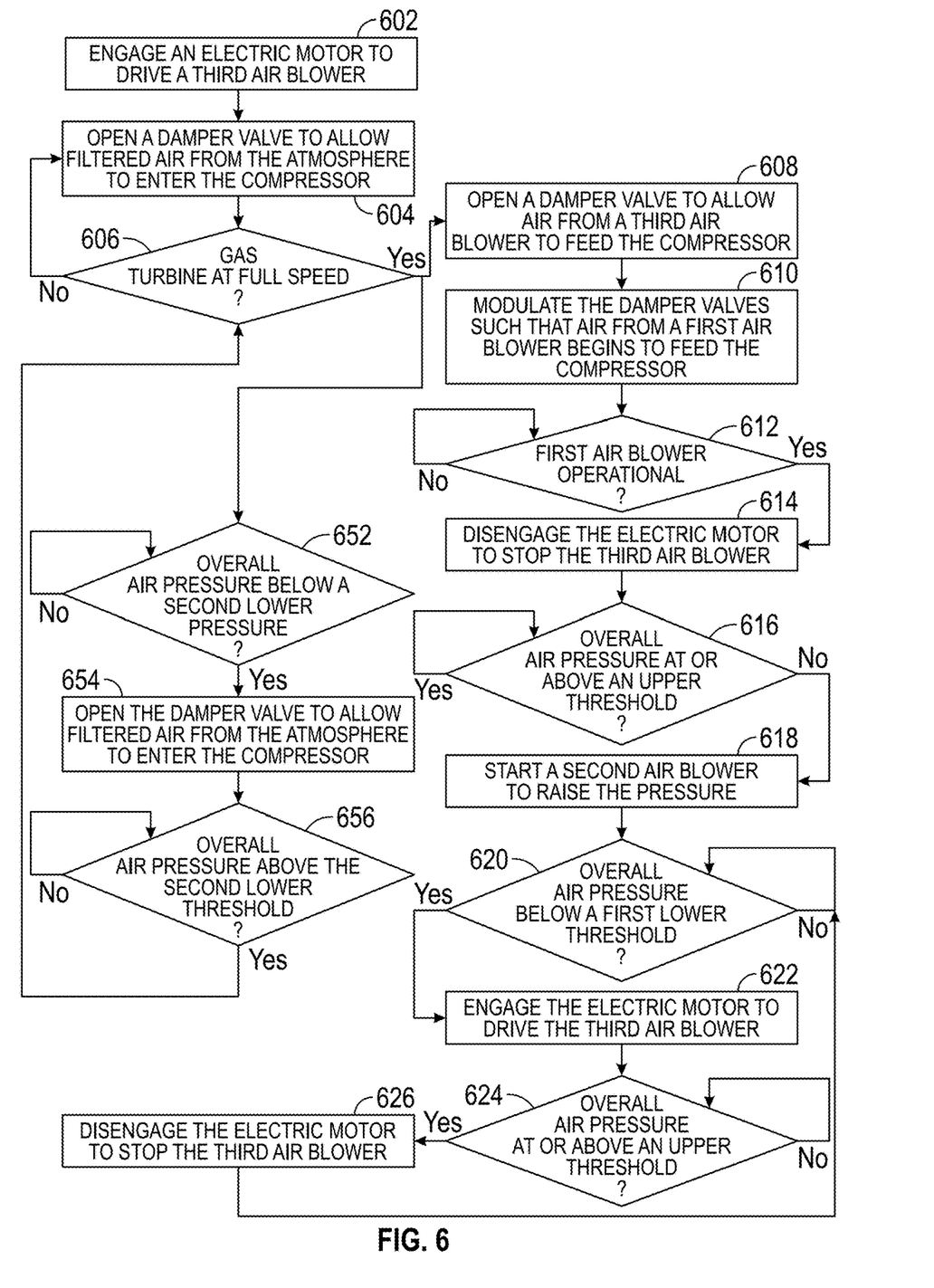
FIG. 6 is a flow diagram showing a gas turbine operation logic that may be used in accordance with various embodiments.

Turning to FIG. 6, a flow diagram 600 shows a gas turbine operation logic that may be used in accordance with various embodiments. In some embodiments, the gas turbine operation logic of flow diagram 600 may be implemented by turbine PLC 290. Following flow diagram 600, an electric motor is engaged to drive a third air blower (block 602). In some embodiments, this may include turbine PLC 290 turning on electric motor 256 such that it causes third air blower 254 to start producing third blower gas stream 258.

A damper valve is opened to allow filtered air from the atmosphere to enter the compressor (block 604). In some embodiments, this may include turbine PLC 290 opening damper valve 1215. It is determined whether the gas turbine has reached full speed (block 606). This may include turbine PLC 290 reading a speed output from turbine 210.

Once the turbine reaches full speed (block 606), a damper valve is opened to allow air from a third air blower to followed by first blower to feed the compressor (block 608). In some embodiments this may include turbine PLC 290 opening damper valve 1209. The damper valves may be modulated so that air from a third air blower followed by first air blower begins to feed the compressor (block 610). In some embodiments this may include PLC 290 modulating damper valve 1203 and damper valve 1215.

It is determined whether the first air blower is operational (block 612). In some embodiments this determination is made by turbine PLC determining that pressure sensor 1211 indicates an increase in pressure. Once the first air blower is operational (block 612), the electric motor is disengaged causing the third air blower to stop (block 614). In some embodiments, this may include PLC 290 switching electric motor 256 off.

With the first air blower operating and the third air blower not operating, it id determined if the overall air pressure is at or above an upper threshold (block 616). In some embodiments, the upper threshold is 1.2 bar. Based upon the disclosure provided herein, one of ordinary skill in the art will recognize a variety of upper thresholds that may be used in relation to different embodiments. In some embodiments, determining the pressure may include turbine PLC 290 sensing the pressure from pressure sensor 1206. Where the upper threshold is met (block 616), the second air blower is not turned on.

Alternatively, where the upper threshold is not met (block 616), the second air blower is started to raise the pressure at the inlet of the compressor (block 618). In some embodiments this may include turbine PLC 290 opening valve 1219. With both first air blower and second air blower operating it is determined whether the overall air pressure is below a first lower threshold (block 620). In some embodiments, the first lower threshold is 1.1 bar. Based upon the disclosure provided herein, one of ordinary skill in the art will recognize a variety of first lower thresholds that may be used in relation to different embodiments. In some embodiments, determining the pressure may include turbine PLC 290 sensing the pressure from pressure sensor 1206.

Where the overall pressure fails to reach at least the first lower threshold (block 620), the electric motor is re-engaged to cause the third air blower to again start blowing air (block 622). With all three of the first air blower, the second air blower, and the third air blower operating, it is determined whether the overall air pressure is at or above the upper threshold (block 620). Where the overall air pressure is at or above the upper threshold (block 620), the electric motor is disengaged to stop operation of the third air blower (block 622). The difference between the first lower threshold and the upper threshold is selected to avoid continuous start and stops of the electric motor.

In parallel, the overall pressure is sensed to determine if it has fallen below a second lower threshold (block 652). In some embodiments the second lower threshold is atmospheric pressure and the sensing is done to identify any sudden loss of pressure at primary air distribution system 222. Where the overall pressure drops below the second lower threshold (block 652), the damper valve is opened to allow filtered air from the atmosphere to enter the compressor (block 654). In some embodiments this may include turbine PLC 290 opening damper valve 1215. It is determined whether the gas turbine has reached full speed (block 606). Once the overall pressure returns to above the second lower threshold (block 656), the process is returned to block 606.

Figure 7:
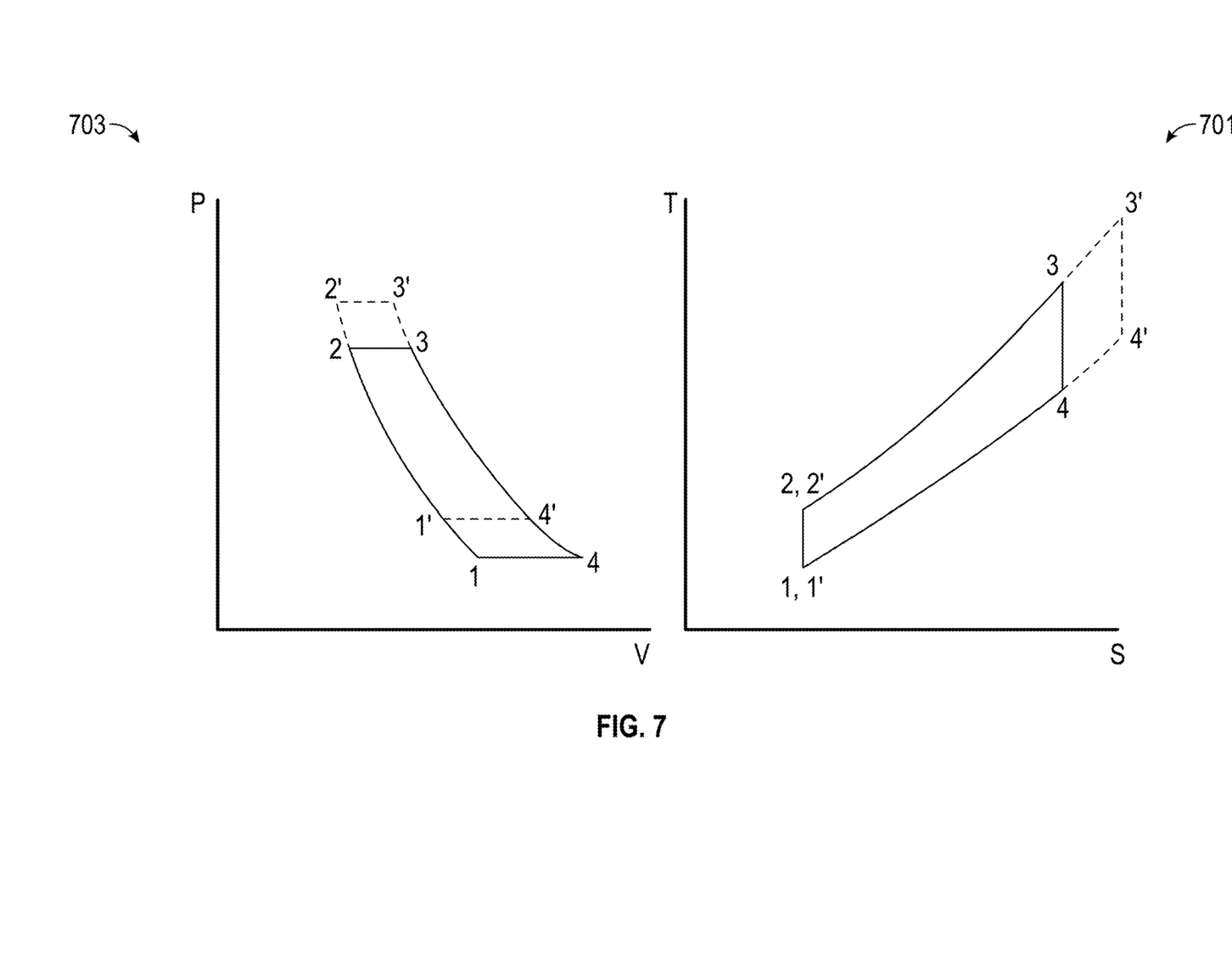
FIG. 7 shows a graph of an example pressure versus specific volume and a graph of an example temperature versus entropy for one embodiment compared to similar graphs for a simple gas turbine cycle.

Turning to FIG. 7, a pressure versus specific volume graph (703) is shown for a simple gas turbine cycle without improvements (1-2-3-4) and for a modified gas turbine (1'-2'-3'-4') according to one embodiment. Additionally, a temperature versus specific entropy graph (701) is shown for a simple gas turbine cycle without improvements (1-2-3-4) and for a modified gas turbine (1'-2'-3'-4') according to one embodiment.

Figure 8:
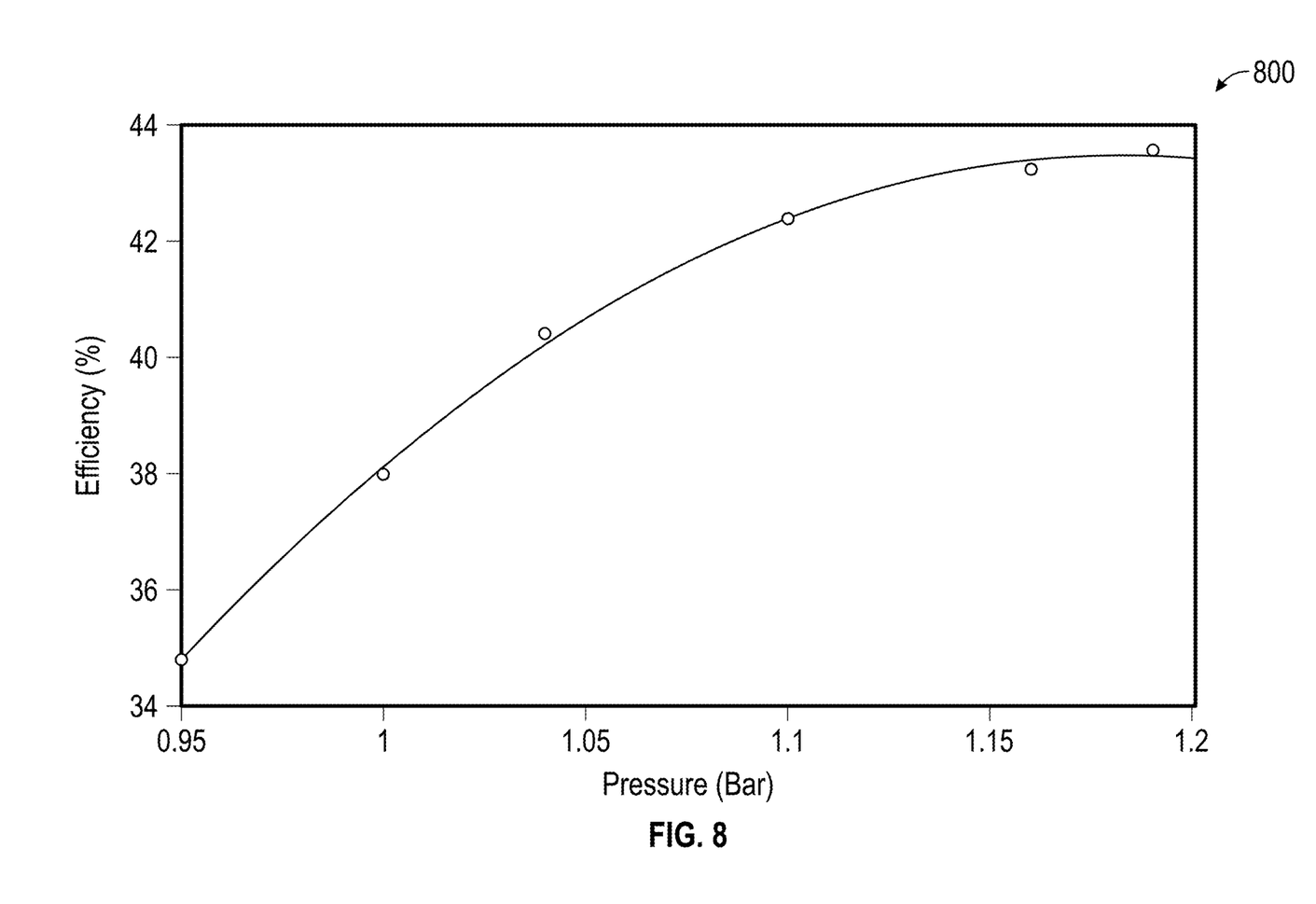
FIG. 8 shows a graph of an example efficiency of a gas turbine cycle as a function of compressor inlet pressure according to some embodiments.

Both pressure versus specific volume graph (703) and temperature versus specific entropy graph (701) represent four processes for a simple gas turbine cycle. During process 1-2, a substance is compressed isentropically in a compressor. "Isentropically" refers to a constant entropy process, which is an adiabatic (no heat transfer) and reversible process. During process 1-2, the pressure and the temperature increase, while the specific volume of the substance flowing through the compressor decreases. Process 2-3 consists of heat addition to the substance exiting the compressor. According to FIG. 7, process 2-3 occurs at constant pressure. During process 2-3, the temperature of the substance flowing through the cycle increases, and the specific entropy increases. Process 3-4 consists of an isentropic expansion of the substance flowing through the cycle in a turbine. During process 3-4, the pressure and the temperature decrease, while the specific volume of the substance flowing through the turbine increases. Process 4-1 is for a closed cycle and consists of heat rejection from the substance exiting the turbine. Process 4-1 occurs at constant pressure. During process 4-1, the temperature of the substance flowing through the cycle decreases, and the specific entropy decreases. At the end of process 4-1, the substance utilized all throughout the cycle returns to the inlet of the compressor, and the cycle begins. From FIG. 8, the thermal efficiency for the simple gas turbine cycle without improvements (1-2-3-4) may be calculated if property values are known, using the equation $$\eta = \frac{W}{Q_{in}} = \frac{P_2(v_3 - v_2) - P_1(v_4 - v_1)}{Q_{in}}$$

where P is used for pressure, v is used for specific volume, W is used for work, and Q is used for heat transfer.

Both pressure versus specific volume graph (703) and temperature versus specific entropy graph (701) represent four processes for an example of a modified gas turbine. During process 1'-2', a substance is compressed isentropically in a compressor. During process 1'-2', the pressure and the temperature increase, while the specific volume of the substance flowing through the compressor decreases. Process 2'-3' consists of heat addition to the substance exiting the compressor. According to FIG. 7, process 2'-3' occurs at constant pressure. During process 2'-3', the temperature of the substance flowing through the cycle increases, and the specific entropy increases. Process 3'-4' consists of an isentropic expansion of the substance flowing through the cycle in a turbine. During process 3'-4', the pressure and the temperature decrease, while the specific volume of the substance flowing through the turbine increases. Process 4'-1' is for a closed cycle is for a different closed system and consists of heat rejection from the substance exiting the turbine. Process 4'-1' occurs at constant pressure. During process 4'-1', the temperature of the substance flowing through the cycle decreases, and the specific entropy decreases. At the end of process 4'-1', the substance utilized all throughout the cycle returns to the inlet of the compressor, and the cycle begins. From FIG. 8, the thermal efficiency for the simple gas turbine cycle without improvements (1'-2'-3'-4') may be calculated if property values are known, using the equation $$\eta' = \frac{W'}{Q'_{in}} = \frac{P_{2'}(v_{3'} - v_{2'}) - P_{1'}(v_{4'} - v_{1'})}{Q'_{in}}$$

where P is used for pressure, v is used for specific volume, W' is used for work, and Q' is used for heat transfer.

Keeping with FIG. 7, the pressure at each state for the modified gas turbine cycle is higher than the pressure at each corresponding state for the simple gas turbine cycle without modifications. The increase in pressure ($P_{2'} > P_2$) at the inlet of the compressor of the modified gas turbine cycle may result in a higher mass flow rate of substance entering the compressor (and flowing through the cycle). This increase in mass flow rate will allow for the temperature at the outlet of the combustor to be increase ($T_{3'} > T_3$). The increase in pressure at the inlet at the compressor and at the outlet of the compressor, and the increase in temperature at the outlet of the combustor for the modified gas turbine cycle compared to the single gas turbine without modifications may result in an increase in thermal efficiency for the modified gas turbine cycle.

Turning to FIG. 8, a graph of efficiency (in percentage) of gas turbine cycles versus compressor inlet pressure (in bar) is presented, according to experimental studies. From this graph, at a pressure of 1 bar, which is approximately equal to atmospheric pressure, the efficiency of a gas turbine cycle may be 38%. Increasing the pressure at the inlet of the compressor to 1.1 bar may yield an overall efficiency of the cycle of close to 40%. Furthermore, increasing the pressure at the inlet of the compressor to 1.2 bar may yield an overall efficiency of the cycle of close to 44%. The plot of efficiency versus compressor inlet pressure may stabilize after a pressure of 1.2 bar. Experimental studies highlight that exceeding 1.2 bar for the pressure at the inlet of the compressor may not further improve the efficiency of the gas turbine cycle.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method to increase the efficiency of a gas turbine cycle, the method comprising:
   directing a stream of compressed air exiting an outlet of a compressor to a combustor;
   injecting a stream of fuel into the combustor, wherein a chemical reaction in the combustor of the stream of compressed air and the stream of fuel yields a stream of combustion products;
   using a turbine to expand the stream of combustion products to yield an expanded stream of combustion products;
   directing the expanded stream of combustion products to a low-pressure turbocharger;
   using the low-pressure turbocharger to power a first air blower, wherein the first air blower is configured to accept a first stream of filtered air and to output a first blower gas stream;
   directing the first blower gas stream to a secondary air distribution system, wherein an output of the secondary air distribution system is an energized stream of air;
   directing the energized stream of air and a stream of filtered air to a primary air distribution system, wherein an output of the primary air distribution system is a stream of compressor supply air; and
   directing the stream of compressor supply air to an inlet of the compressor.

2. The method of claim 1, the method further comprising:
   directing a stream of source fuel to a high-pressure turbocharger to yield power to operate a second air blower and a stream of combustor fuel, wherein the second air blower is configured to accept a second stream of filtered air and output a second blower gas stream; and
   directing the second blower gas stream to the secondary air distribution system.

3. The method of claim 2, wherein the first air blower and the second air blower are both operating during a time period, and wherein the secondary air distribution system receives a combination of the first blower gas stream and the second blower gas stream.

4. The method of claim 1, the method further comprising:
   powering a third air blower by an electric motor, wherein the third air blower is configured to accept a third stream of filtered air and to output a third blower gas stream; and
   directing the third blower gas stream to the secondary air distribution system.

5. The method of claim 4, wherein the third air blower is turned off when the first air blower is powered on.

6. The method of claim 4, wherein the first air blower and the third air blower are both operating during a time period.

7. The method of claim 2, the method further comprising:
   powering a third air blower by an electric motor, wherein the third air blower is configured to accept a third stream of filtered air and to output a third blower gas stream; and
   directing the third blower gas stream to the secondary air distribution system.

8. The method of claim 7, wherein the time period is a first time period, wherein all of the first air blower, the second air blower, and the third air blower are operating during a second time period, and wherein during the second time period the secondary air distribution system receives a combination of the first blower gas stream, the second blower gas stream, and the third blower gas stream.

9. The method of claim 8, wherein a pressure of the combination of the first blower gas stream, the second blower gas stream, and the third blower gas stream is between a lower threshold value and an upper threshold value.

10. The method of claim 9, wherein the lower threshold value is 1.1 bar and the upper threshold value is 1.2 bar.

11. A system for increasing the efficiency of a gas turbine cycle, the system comprising:
    a compressor comprising a compressor inlet and a compressor outlet, wherein the compressor is configured to increase a pressure of a stream of compressor supply air, and to expel a compressed stream of air via the compressor outlet;
    a combustor configured to allow a chemical reaction between the compressed stream of air and a stream of fuel at a first pressure to yield a stream of combustion products exhausted via a combustor outlet, wherein the compressed stream of air is received from the compressor via a first combustor inlet, and wherein the stream of fuel is received via a second combustor inlet;
    a turbine comprising a turbine outlet and a turbine inlet fluidically coupled downstream from the combustor outlet, wherein the turbine is configured to expand the stream of combustion products to yield an expanded stream of combustion products exiting the turbine outlet;
    a low-pressure turbocharger fluidically coupled to the turbine outlet and configured to power a first air blower using energy from the expanded stream of combustion products;
    the first air blower configured to accept a first stream of filtered air and to output a first blower gas stream, wherein the first blower gas stream is incorporated into the stream of compressor supply air.

12. The system of claim 11, the system further comprising:
    a high-pressure turbocharger configured to:
      receive a stream of fuel at a second pressure;
      provide the stream of fuel at the first pressure, wherein the first pressure is lower than the second pressure;
      power a second air blower using energy derived from a difference between the stream of fuel at the second pressure and the stream of fuel at the first pressure;
    the second air blower configured to accept a second stream of filtered air and to output a second blower gas stream, wherein the second blower gas stream is incorporated into the stream of compressor supply air.

13. The system of claim 12, wherein the first air blower and the second air blower are both operating during a time period.

14. The system of claim 12, the system further comprising:
an electric motor;
a third air blower configured to operate when the electric motor is engaged; wherein the third air blower is configured to accept a third stream of filtered air and to output a third blower gas stream; and
wherein the second blower gas stream is incorporated into the stream of compressor supply air.

15. The system of claim 14, wherein the third air blower is turned off when the first air blower is powered on.

16. The system of claim 14, wherein the first air blower and the third air blower are both operated during a time period.

17. The system of claim 12, the system further comprising:
an electric motor;
a third air blower configured to operate when the electric motor is engaged; wherein the third air blower is configured to accept a third stream of filtered air and to output a third blower gas stream; and
wherein the second blower gas stream is incorporated into the stream of compressor supply air.

18. The system of claim 17, wherein the time period is a first time period, wherein all of the first air blower, the second air blower, and the third air blower are operating during a second time period, and wherein during the second time period the stream of compressor supply air includes the first blower gas stream, the second blower gas stream, and the third blower gas stream.

19. The system of claim 18, the system further comprising:
a pressure sensor configured to sense a pressure of a combination of the first blower gas stream, the second blower gas stream, and the third blower gas stream; and
wherein the stream of compressor supply air includes the first blower gas stream, the second blower gas stream, and the third blower gas stream when the pressure of the combination of the first blower gas stream, the second blower gas stream, and the third blower gas stream is between a lower threshold value and an upper threshold value.

20. The system of claim 19, wherein the lower threshold value is 1.1 bar and the upper threshold value is 1.2 bar.

* * * * *